July 25, 1933.  W. S. BRINK  1,919,499
DUAL AND SINGLE RIM WHEEL
Filed May 3, 1930  4 Sheets-Sheet 1
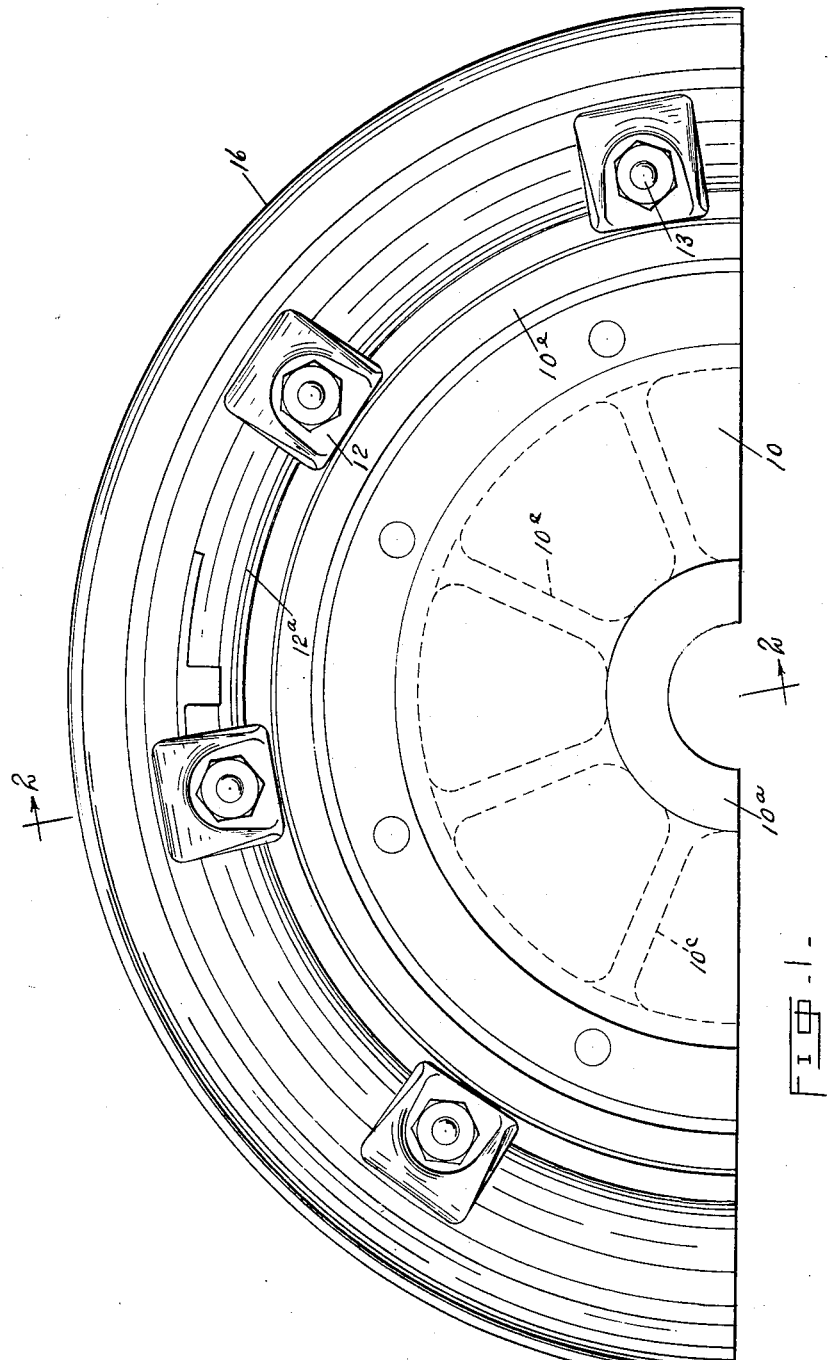
INVENTOR
WINFIELD S. BRINK.
BY
ATTORNEYS.

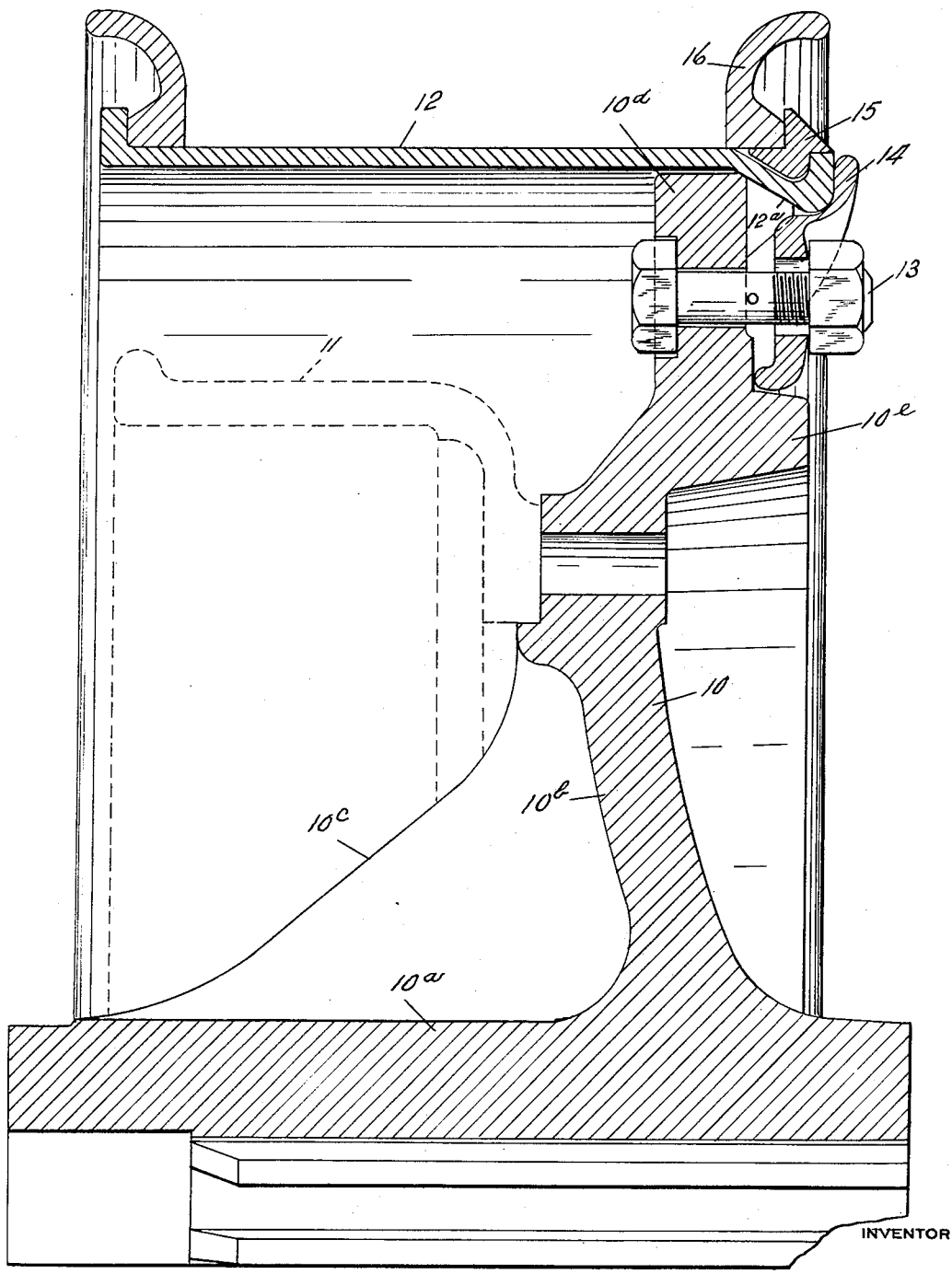

July 25, 1933.　　　W. S. BRINK　　　1,919,499
DUAL AND SINGLE RIM WHEEL
Filed May 3, 1930　　　4 Sheets-Sheet 3
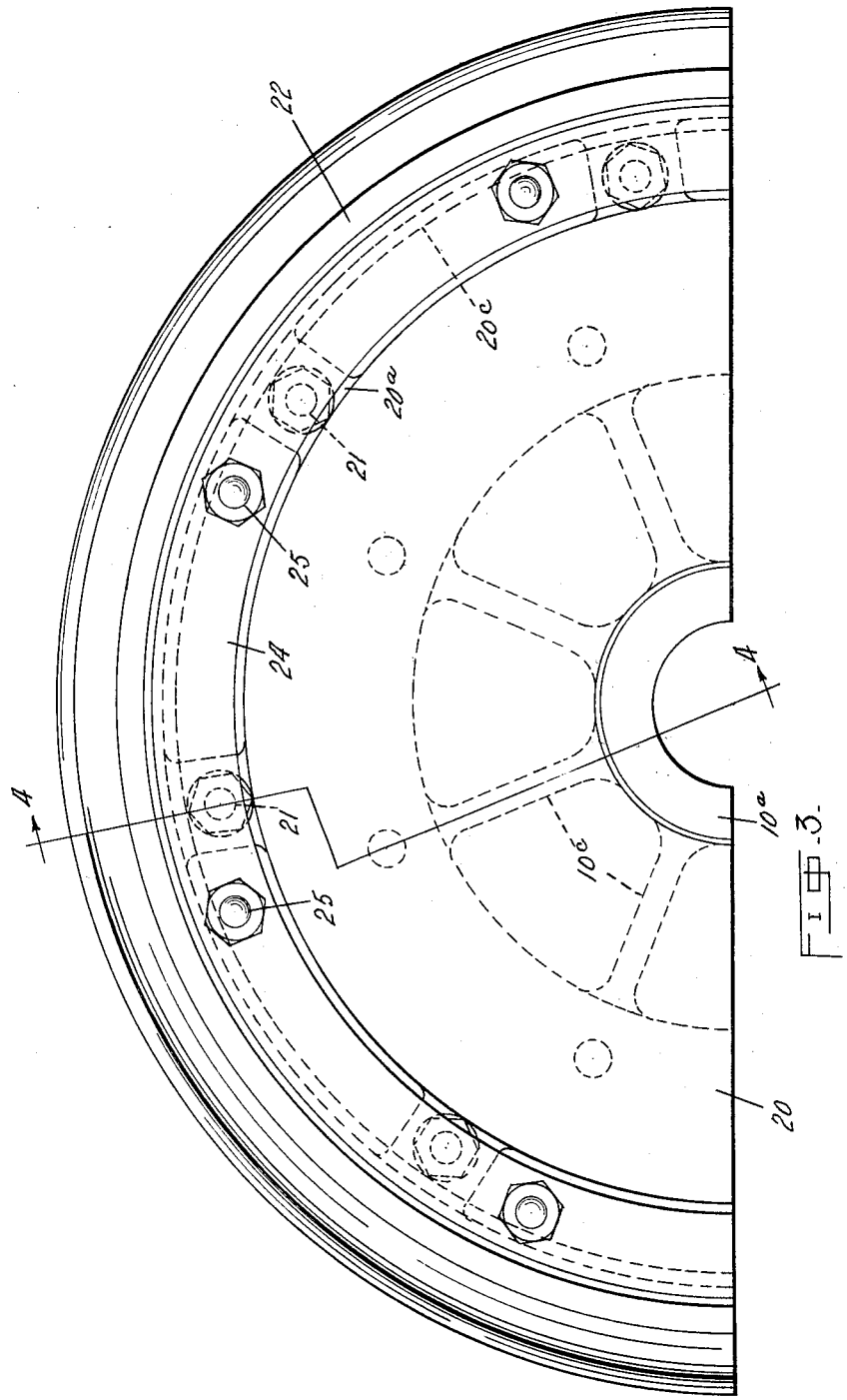
INVENTOR
WINFIELD S. BRINK.
BY
Ely & Barrow
ATTORNEYS.

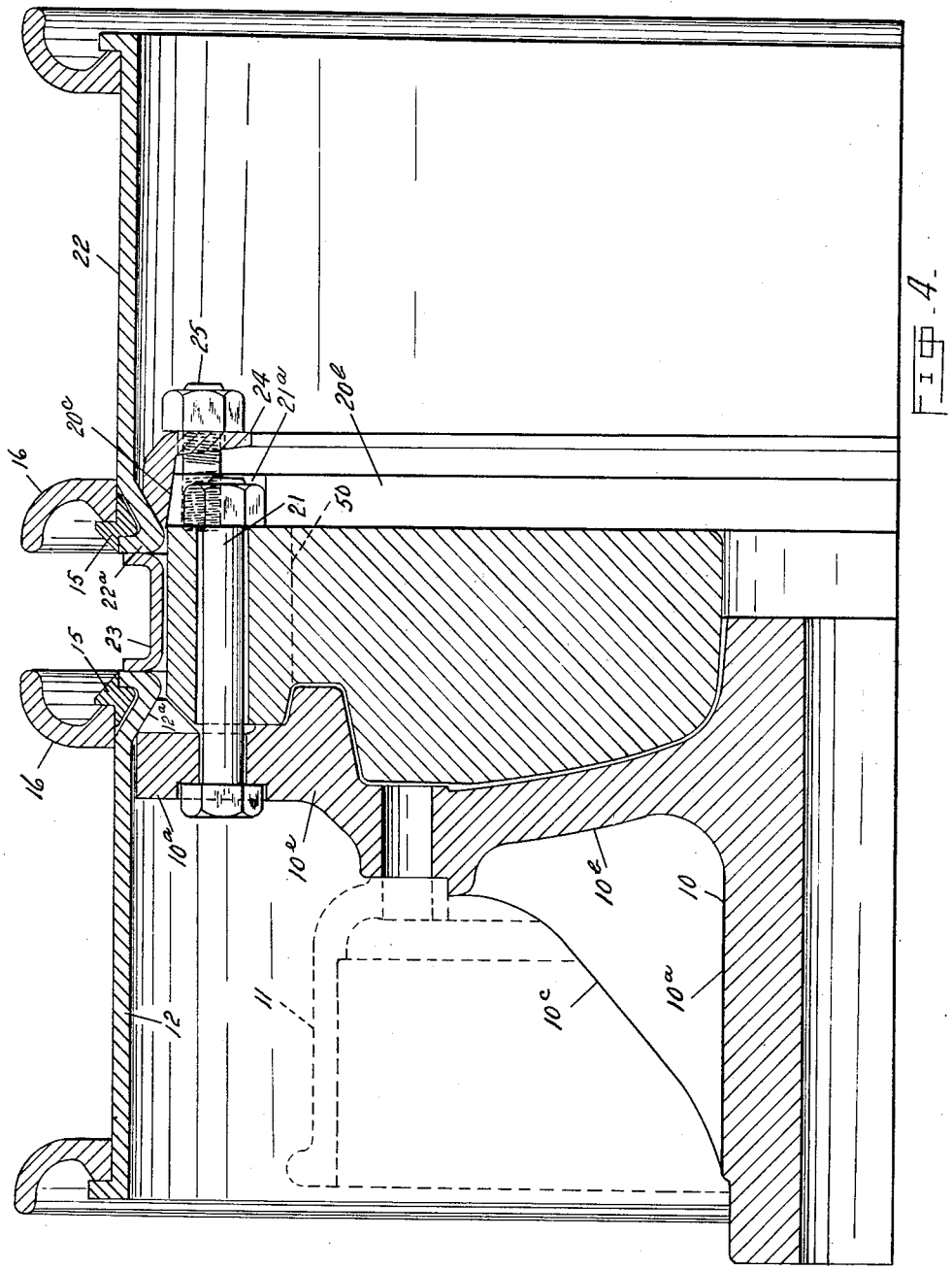

Patented July 25, 1933

1,919,499

UNITED STATES PATENT OFFICE

WINFIELD S. BRINK, OF AKRON, OHIO, ASSIGNOR TO THE FIRESTONE STEEL PRODUCTS COMPANY, OF AKRON, OHIO, A CORPORATION OF OHIO

DUAL AND SINGLE RIM WHEEL

Application filed May 3, 1930. Serial No. 449,503.

This invention relates to a wheel which can be adapted to mount a single tire-carrying rim or dual tire-carrying rims.

It is an object of the invention to provide a motor wheel which can be quickly and easily changed from mounting a single tire-carrying rim to a wheel mounting dual tire-carrying rims.

A further object of the invention resides in providing means for increasing the traction of the wheel when the dual tire rims are mounted thereon.

The above and other objects of the invention are achieved by the apparatus illustrated in the accompanying drawings and described below, it being understood that the invention is not limited to the exact form thereof shown and described.

In the drawings:

Figure 1 is a side elevation of a diametric half of a wheel embodying the invention with a single tire-carrying rim mounted thereon.

Figure 2 is a sectional view taken on line 2—2 of Figure 1.

Figure 3 is a side elevation of a diametric half of the wheel of Figures 1 and 2 but with dual rims mounted thereon.

Figure 4 is a sectional view taken on line 4—4 of Figure 3.

The numeral 10 indicates an integral wheel, constructed in accordance with the invention, which preferably comprises a hub 10$^a$, a radial flange 10$^b$, offset as at 10$^d$ and strengthened by ribs 10$^c$, and a longitudinally extending circumferential tongue 10$^e$. The wheel 10 may have a brake drum 11 secured thereto.

A rim 12 which is formed with a bevel 12$^a$ thereon is carried on the wheel 10 by cooperation of the bevel 12$^a$ with the slightly tapered edge to the offset flange 10$^d$. A plurality of bolts 13 spaced circumferentially about the wheel flange 10$^d$ serve to force clamps 14 against the rim 12 to hold it tightly on the wheel.

In changing the wheel 10 to mount dual tire-carrying rims, the bolts 13 and clamps 14 of the single rim type shown in Figures 1 and 2 are removed and a circular weight 20 is secured to the wheel 10 by bolts 21, the nuts of which are received in the weight 20 in recessed portions 20$^a$ of a longitudinally extending circumferential rib 20$^b$ whose outer periphery is tapered as at 20$^c$. As illustrated in Figure 4 the face of the weight 20 adjacent the wheel 10 is appropriately formed to fit with the wheel surface to give a solid integral weighted wheel structure. The diameter of the weight is such that the rim 12 will just slide thereover in tire changes.

A second rim 22 formed with a bevel 22$^a$ is adapted to be carried on the weight 20 and is spaced from the rim 12 by a U-shaped spacer ring 23. A wedge ring 24 sliding on the tapered surface 20$^c$ of the weight 20 is provided to cooperate with the bevel 22$^a$ of the rim 22 and is clamped in place by a plurality of stud bolts 25 secured in the weight 20. The clamping action of the wedge ring 24 acting through the rim 22 and spacer 23 forces the rim 12 tightly against the flange 10$^d$ to hold it securely in place. The wedge ring 24 also forces the rim 22 tightly against the spacer 23 and this in conjunction with the wedging action thereof also securely clamps the rim 22 on the wheel.

It will be understood that any type rim may be used in the practice of the invention as long as a suitable bevel or shoulder is provided thereon to cooperate in the manner above described. In the type of rim illustrated the bevels 12$^a$ and 22$^a$ also form gutters for locking rings 15 which hold side rings 16 on the rims.

The present invention allows a wheel to be readily converted, with but little extra equipment, from a dual rimmed to a single rimmed wheel or vice versa. The change can be made by the unskilled workman with simple tools.

The wheels of the invention are particularly adapted for use with tractors or like vehicles where at certain times, such as when used on pavement or the like, a single tire will be sufficient, but which vehicles at other times, when used on soft or yielding ground, require additional support and traction, thus necessitating a dual tired wheel. While the invention can be used on either driving or idler wheels it is particularly adapted for driving wheels in that the additional tire, in combination with the weight which serves to support it, gives increased traction. The weight 20 being unsprung tends to hold the tires carried on the rims directly in contact with the surface of the road while passing over bumps or the like, thus giving increased traction in combination with the second rim and tire. The weight also enters aptly into the combination to act as a support for the second rim. When it is no longer necessary to have the extra surface and traction the wheel may readily be changed back to the single rimmed wheel as will be understood.

In the practice of the invention it will be evident that at all times the weight 20 will not be necessary in the dual wheel and that it may take the form of a relatively light extension ring, identical in form with the weight, but whose inner periphery is shown by the dotted line 50. The extension ring will function, except for the increased traction due to the weight, exactly similar to the weight.

As many other changes could be made in the construction, it is intended that all matter contained in the above description or shown in the accompanying drawings shall be interpreted as illustrative only and not in a limiting sense, accordingly various modifications and applications of the invention can be resorted to without departing from the spirit of the invention or the scope of the appended claims.

What is claimed is:

1. In combination, a wheel having a peripheral rim seat, a first tire carrying rim mounted on said seat, an annular traction increasing weight secured to the wheel to project axially from said seat and first rim, a second tire carrying rim adapted to be positioned so as to project, for the major portion of its width, axially from the outer side of said weight member, said weight member serving as a support for said second rim, and means for securing the rims in the relative positions above specified comprising means acting on said second mentioned rim and through it to the first mentioned rim, to secure the latter on its seat.

2. In combination, a wheel including a hub and a radial flange having a peripheral rim seat offset axially from the central radial plane of the hub, a first tire carrying rim engaging said seat in an offset position so as to be axially centered with respect to the hub, an annular weight member mounted on said radial flange to project axially beyond said hub in the direction of offset of said rim seat, a second tire carrying rim adapted to be supported in an offset position on the projecting portion of said weight member so as to project axially beyond said member, and means for securing the rims in the relative positions mentioned comprising means acting on said second mentioned rim and through it to the first mentioned rim to secure the latter on its seat.

WINFIELD S. BRINK.